United States Patent [19]

Friedland

[11] 3,746,041

[45] July 17, 1973

[54] FLUID FLOW CONTROL SYSTEM
[75] Inventor: Harry Friedland, Las Vegas, Nev.
[73] Assignee: Process Systems, Inc., Las Vegas, Nev.
[22] Filed: Feb. 2, 1971
[21] Appl. No.: 111,945

[52] U.S. Cl.............. 137/599, 137/552, 137/601, 251/282, 251/30
[51] Int. Cl............................................ F16k 47/10
[58] Field of Search.................. 137/599, 606, 601, 137/552, 552.5, 637.05, 625.28, 110, 613, 625.8, 487.5; 251/324, 129, 282, 30

[56] References Cited
UNITED STATES PATENTS

| | | | |
|---|---|---|---|
| 1,436,417 | 11/1922 | Trumble | 137/599 |
| 2,627,280 | 2/1953 | Adelson | 137/599 X |
| 2,211,319 | 8/1940 | Camerota | 251/282 X |
| 1,752,908 | 4/1930 | Hosel | 137/601 |
| 1,799,113 | 3/1931 | Miedbrodt | 251/30 X |
| 3,060,966 | 10/1962 | Ratelband | 137/601 |
| 3,331,393 | 7/1967 | Ernyei | 137/599 |
| 3,072,146 | 1/1963 | Gizeski | 137/552 |

FOREIGN PATENTS OR APPLICATIONS

| | | | |
|---|---|---|---|
| 1,186,275 | 8/1957 | France | 251/282 |
| 619,527 | 5/1961 | Canada | 251/30 |
| 1,920,617 | 11/1970 | Germany | 251/282 |
| 760,055 | 10/1956 | Great Britain | 251/282 |

Primary Examiner—Henry T. Klinksiek
Assistant Examiner—Robert J. Miller
Attorney—Christie, Parker & Hale

[57] ABSTRACT

A plurality of individually actuatable, bistable, digital valve elements interconnect an upstream chamber and a downstream chamber. Each valve element has a stationary cylindrical cage disposed in the upstream chamber and an axially movable cylindrical plug disposed around the cage. The interior of the cage is open at one end to communicate with the downstream chamber and has a perforated side wall to communicate with the upstream chamber. The resultant areas of the perforations in the side walls of at least some of the respective cages vary in accordance with a geometric progression, and the areas of the open ends of these cages are the same. The plug has ports at one end to equalize the pressure between the plug and the cage. The position of the plug is controlled by a two-stage arrangement. One stage is a piston driven by a fluid from a supply manifold in common with the other valve elements. The other stage is a pilot valve for controlling the fluid applied to the piston. The pilot valves and the common supply manifold are enclosed within a unitary housing.

26 Claims, 5 Drawing Figures

United States Patent [19]
Friedland

[11] 3,746,041
[45] July 17, 1973

Fig_1

INVENTOR.
HARRY FRIEDLAND
BY
Christie, Parker & Hale
ATTORNEYS

Fig_2

Fig_4A

Fig_4B

FLUID FLOW CONTROL SYSTEM

BACKGROUND OF THE INVENTION

This invention relates to the control of fluid flow and, more particularly, to new configurations for valve elements and improved arrangements for controlling such valve elements.

In a copending application of Roger S. Hutton, Ser. No. 64,142, filed Aug. 3, 1970, and assigned to the assignee of the present application, there is disclosed a fluid flow control system employing a plurality of individually actuatable, bistable, digital valve elements. The valve elements are radially disposed between upstream and downstream chambers. Each valve element has a flow determining orifice and a plug that assumes one of two bistable positions—the plug covering the orifice in the closed state and uncovering the orifice in the open state. The orifice areas of the valve elements are weighted in accordance with a geometric progression. To provide the desired flow rate, the valve elements are selectively opened and closed. The Hutton application teaches that the valve elements are all disposed in a plane perpendicular to the direction of fluid flow through the chambers and are directed together so the fluid streams flowing through the open valve elements collide. As a result, the effective orifice area of each valve element is independent of the state, i.e., open or closed, of the other valve elements, the effective orifice areas of the valve elements remain unaffected by variations in the fluid pressure in the system, and cavitation is prevented. The Hutton application also teaches that the plugs of the open valve elements are positioned out of the fluid stream in the static fluid region. As a result, small unavoidable changes in the position of the plug that occur in the course of prolonged use do not influence the effective orifice area of the valve element, i.e., the plug does not modulate the flow rate as its position changes. In summary, the described fluid control system possesses a fast response time and a predictable resultant effective orifice area that depends only upon the states of the valve elements. In the course of controlling the fluid that flows through the system, the downstream fluid pressure varies widely depending upon the resultant effective orifice area of the open valve elements. Contrary to a system using a single analog control valve, there may be a large downstream pressure exerted on a closed valve element because of the effect of the remaining open valve elements.

The valve elements themselves in the Hutton application each comprise a stationary cylindrical cage or housing and a cylindrical plug that is axially movable inside the cage. The side wall of the cage is perforated to communicate with the upstream conduit and one end of the cage is open to communicate with the downstream conduit. The flow determining orifice is formed at the open downstream end of the cage. The plug moves axially within the cage—in the open state, it is raised to uncover the perforations in the side wall and the flow determining orifice and in the closed state, it is lowered to seal the orifice and cover the perforations. This valve element configuration has a number of shortcomings that tend to increase the power requirements for actuating the valve elements, prolong the response time of the system, and reduce the life and reliability of the seals.

First, the plug must have a rather long stroke to be positioned in the static fluid region when the valve element is open. The turbulence created within the cage of an open valve element may tend to draw the plug into the stream of fluid flowing through the element. To overcome this tendency, the plug must be raised substantially above the position required simply to uncover the perforations in the side wall of the cage. Consequently, the distance the plug must travel between the open and closed states, i.e., the stroke of the plug, and the height of the cage are extended.

Second, the axial forces exerted on the plug by the downstream pressure are not balanced effectively. In spite of balancing ports formed at the closed end of the plug, the plug is subjected to substantial axial forces as the valve elements open and close in the course of operation of the system.

Third, the valve seal is located in the path of the fluid stream inside the cage where it surrounds the orifice. As the open end of the plug covers the orifice, it engages the seal to close the valve element. Being subjected to the turbulence and dynamic forces found in the fluid stream, the seal wears quickly and may become dislodged from its resting place.

To provide the power required for a fast response, the valve elements must ordinarily be controlled by a two-stage arrangement comprising a pilot valve and an actuator. The complexity of the control arrangement is multiplied by the number of valve elements, each of which must be provided with fluidic and/or electrical connections. Furthermore, in a practical system, each of the valve elements should be individually removable in a simple, straightforward manner; and, to whatever extent possible, the components of the valve elements and the control arrangement should be interchangeable independent of the flow capacity of the system or the orifice areas of the valve elements. The Hutton application is not concerned with these problems.

SUMMARY OF THE INVENTION

According to one aspect of the invention, the conventional plug and cage positions of the bistable valve elements in the described type of fluid control system are reversed, i.e., the cage is inside the plug. The plug is disposed around the cage and the perforations comprise the flow determining orifice. In the closed state of the valve elements, the plug covers the perforations, thereby sealing the cage from fluid flow, and in the open state, the plug uncovers the perforations, thereby permitting fluid flow through the cage. By reversing component positions, the plug does not have to be raised any further than is required to uncover all the perforations to remove itself from the fluid stream, i.e., the dynamic fluid region. Accordingly, the plug requires a much shorter stroke and the height of the cage can be reduced so it is even shorter than the plug.

An important feature of the invention is the isolation of the plug in its direction of movement from forces due to the downstream pressure. The plug and the cage are snug fitting coaxial cylinders and the perforations are formed in the side wall of the cage. The only force acting on the plug due to the downstream pressure in the cage is exerted perpendicular to the direction of plug movement. The isolation is further enhanced by providing no seals on the plug.

Preferably, an annular base seal is retained around the outside of the cage. The end of the plug engages the base seal when the valve element is in the closed state. Further, one or more ports at the end of the plug balance approximately the axial forces exerted on the plug due to the upstream pressure. An annular side seal is retained around the side of the cage between the perforations and the end of the cage to seal the perforations from the balancing ports when the valve element is in the closed state.

The connection of an actuating rod to the end of the plug unbalances the forces exerted on the plug in the direction of plug movement due to the upstream pressure. This force unbalance is cancelled when the valve element is in the closed state by forming two regions at the open end of the plug. One region engages the base seal; the other region is exposed to the upstream pressure. The area of the sealed region is made equal to the cross sectional area of the actuating rod, thereby creating an equal force unbalance in the opposite direction.

According to another aspect of the invention, the valve elements are controlled by individual fluid responsive actuators that are supplied fluid by a common manifold. Individual bistable pilot valves control the flow of fluid from the common supply manifold to the actuators, thereby controlling the corresponding valve elements. The manifold and the pilot valves are disposed in a common annular housing having connections to the actuators that are easily severed for component replacement.

BRIEF DESCRIPTION OF THE DRAWINGS

The features of a specific embodiment of the best mode contemplated of carrying out the invention are illustrated in the drawings, in which.

DETAILED DESCRIPTION OF THE DRAWINGS

Figure 1:
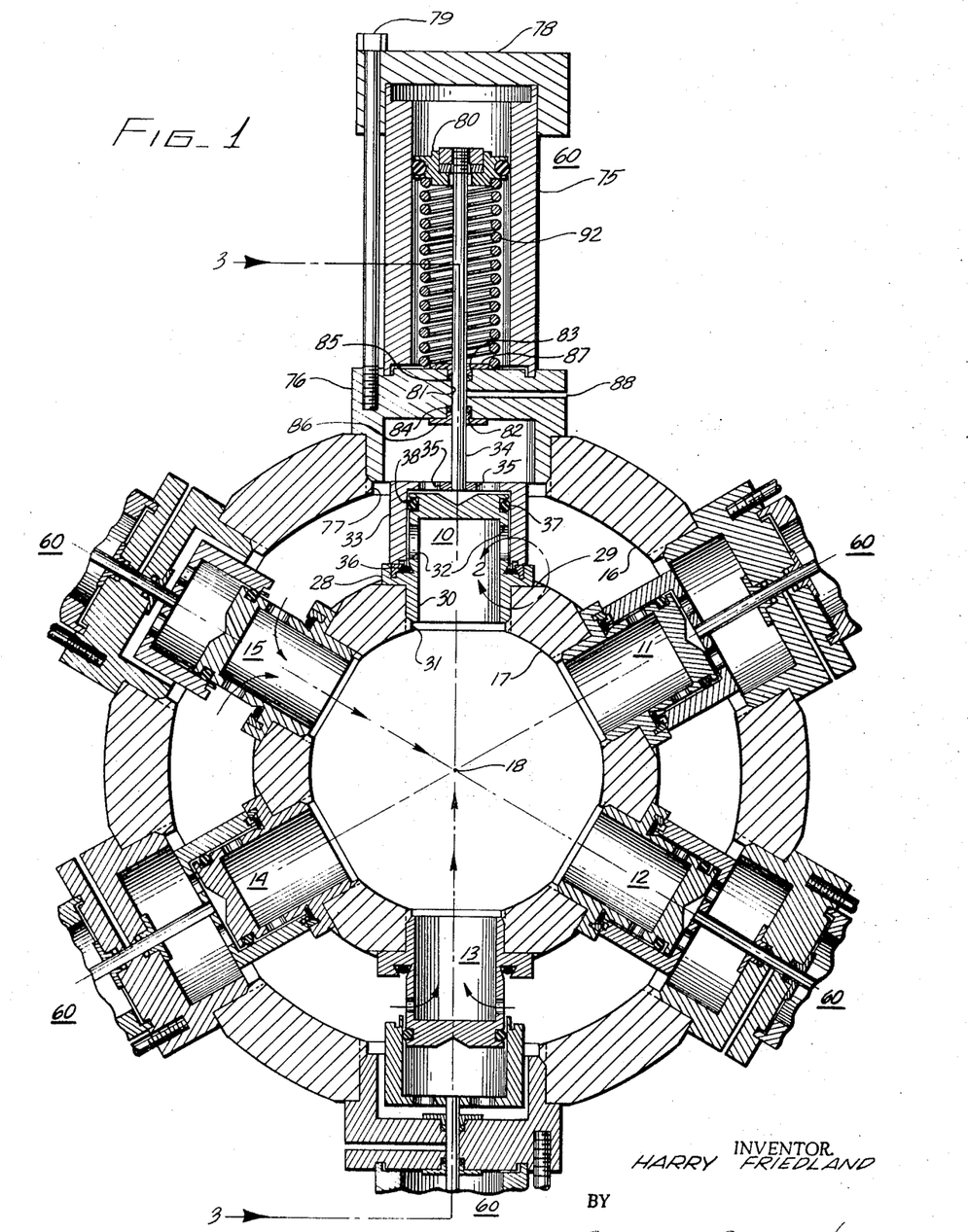
FIG. 1 is a front elevation view in section of a fluid control system incorporating the principles of the invention.
Figure 3:
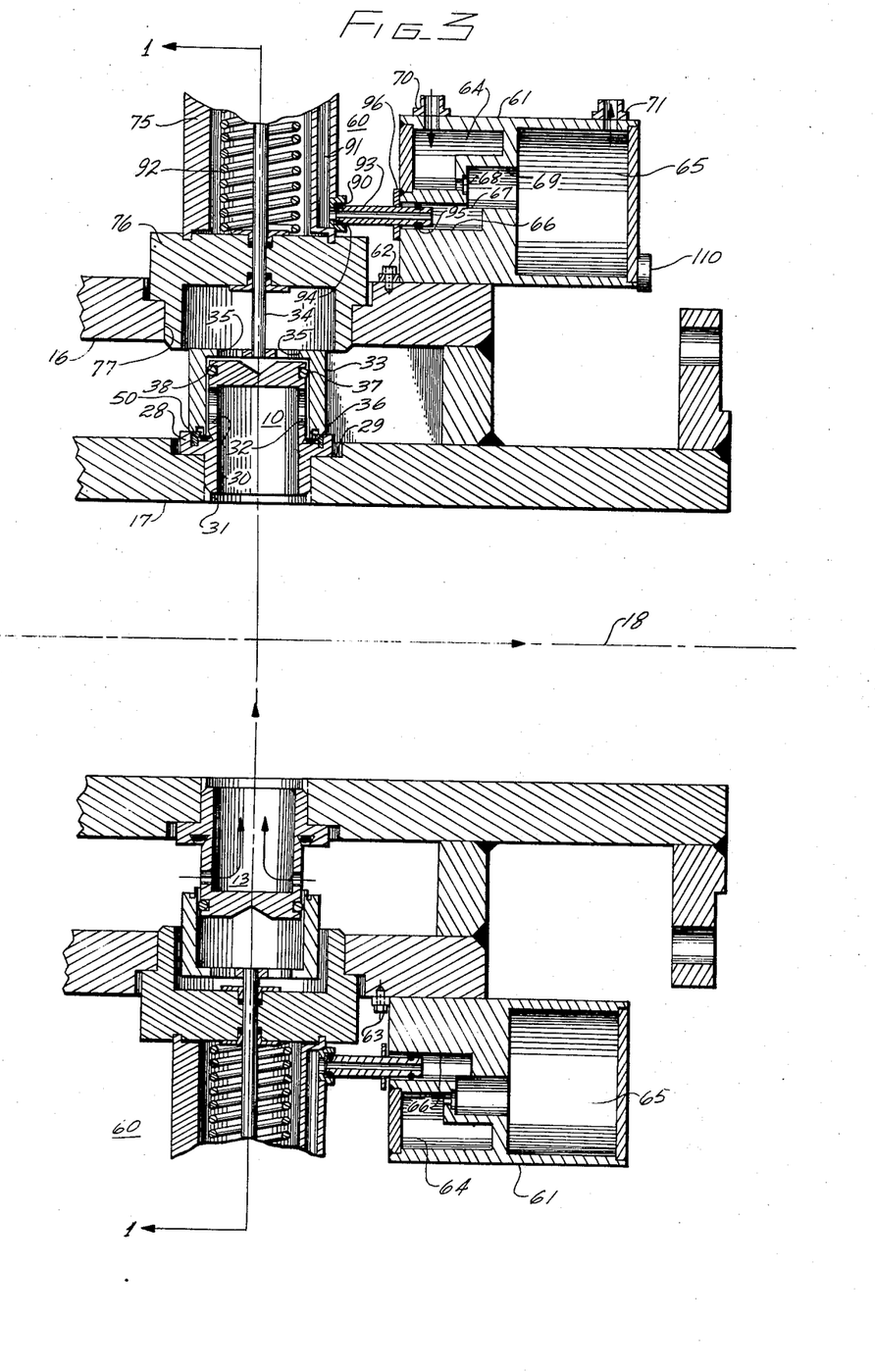
FIG. 3 is a side elevation view in section of the system of FIG. 1.

In FIGS. 1 and 3 there is shown a fluid flow control system that comprises a plurality of individually actuatable bistable digital valve elements designated 10, 11, 12, 13, 14, and 15. Valve elements 10 through 15 interconnect a large cylindrical upstream chamber or conduit 16 and a small cylindrical downstream chamber or conduit 17, which are coaxially disposed about an axis 18. Valve elements 10 through 15 are in one of two stable states, open or closed. As indicated by the arrows in FIGS. 1 and 3, fluid under pressure in upstream chamber 16 flows along axis 18 to the valve elements, passes through the open valve elements (13 and 15) to downstream chamber 17, and continues to flow along axis 18 away from the valve elements. The fluid flow rate is controlled by selectively opening and closing different combinations of valve elements 10 through 15, which have orifice areas following a geometric progression. As depicted in FIGS. 1 and 3, valve elements 10 through 15 are all disposed in a plane transverse to the direction of flow, i.e., axis 18, and are directed so the fluid streams passing through the open valve elements impinge upon axis 18 and collide.

Valve element 10 has a cylindrical cage or housing 30 that is open at one end and closed at the other end. An annular flange 28 is formed around the outside of cage 30 between its ends. The side wall of downstream chamber 17 has a threaded opening 31 dimensioned to receive cage 30, which has matching threads around the outside surface between its open end and flange 28. Thus, a threaded connection is formed between downstream chamber 17 and cage 30 and a metal-to-metal seal is formed between flange 28 and a flat surface 29 on the outside of downstream chamber 17. A number of perforations 32, e.g. four or six, are formed in the side wall of cage 30. Perforations 32 are preferably distributed in oppositely arranged pairs so the fluid flowing through them collides inside cage 30 and creates turbulence therein. A cylinderical plug or cover 33 open at one end and closed at the other end is disposed around cage 30 in snug fitting coaxial relationship therewith. One end of an actuating rod 34 is attached to plug 33 at its closed end and balancing ports 35 are formed at its closed end. The axis of rod 34 is aligned with the axis of cage 30 and plug 33. As described in more detail below, rod 34 is raised and lowered to place plug 33 in one of two stable positions. In one stable position, the open end of plug 33 lies slightly above the top of perforations 32. Thus, perforations 32 are completely uncovered, plug 33 is out of the fluid stream in the static fluid region because the flow is laminar, and valve element 10 is in the open state. In the other stable position, the open end of plug 33 rests on flange 28. Thus, perforations 32 are covered and valve element 10 is in the closed state. The length of the stroke of plug 33 is essentially the distance from the top of perforations 32 to flange 28 and the closed end of cage 30 is slightly shorter than plug 33.

Figure 2:
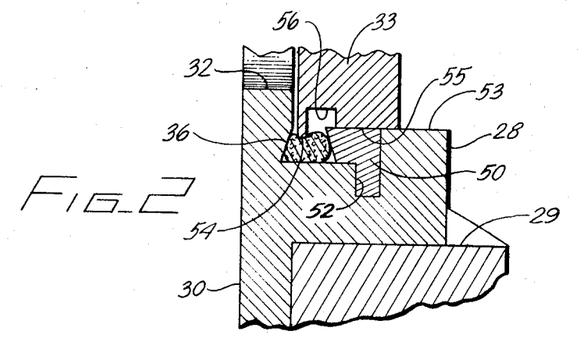
FIG. 2 is a partial enlargement of part of the system of FIG. 1 depicting a seal.

As described in more detail below in connection with FIG. 2, an annular O-ring 36, which is retained relative to cage 30, engages the open end of plug 33 when valve element 10 is in the closed state to seal perforations 32 from the fluid in upstream chamber 16. An O-ring 36 is retained in a groove 38 that is formed in the outer surface of the side wall of cage 30 between perforations 32 and its closed end. O-ring 37 engages the inner surface of the side wall of plug 33 to seal perforations 32 from the pressure balancing fluid supplied to the space between cage 30 and plug 33 through ports 35. O-rings 36 and 37 are not subjected to excessive wear or likely to become dislodged because they are located outside of the fluid stream, i.e., in the static fluid region. As plug 33 move up and down over cage 30, contact is made only with O-ring 37. As a result, precise axial alignment between rod 34 and cage 30 is not necessary so rod 34 can have a smaller cross sectional diameter than would be possible if precise axial alignment were critical.

Valve elements 11 through 15 are identical to valve element 10 except for the resultant area of perforations 32. Perforations 32 comprise the orifice that determines the flow rate through each valve element. The orifice areas for the respective valve elements, i.e., the resultant areas of the perforations, are weighted to follow respectively a geometric progression. If desired, the larger orifice areas could deviate from a geometric progression for the reason explained in the Hutton application or all the orifice areas could be identical.

It is to be noted that the diameter of each valve cage is the same, so the port leading to downstream chamber 17 at the open end of the valve cage does not vary from valve element to valve element, in contrast to the Hutton valve elements. This has the advantage of moving the flow determining orifice upstream of th turbulence created inside the cage. Consequently, the vena contracta is more completely dissipated because the fluid streams are subjected to two collisions—one in the cage and another in the downstream chamber—after passage through the flow determining orifice.

When one valve element is closed while some of the other valve elements are open, the downstream pressure inside the cage of the closed valve element can be high and subject to large fluctuations. However, it should be noted that virtually no axial force is exerted on the valve plugs due to the downstream pressure. The plug is exposed to the pressure inside the cage only over the annular area between O-rings 36 and 37. Since the cage and the plug are cylindrical, the resulting pressure forces are exerted on the plug only in a direction perpendicular to the axis of the plug. In other words, the plug is isolated in the axial direction from the downstream prssure inside the cage. This isolation is further enhanced by the absence of a seal on the plug. If, for example, O-ring 37 were retained by plug 33, a small axial force would be transmitted to plug 33 through the seal and its retaining groove in plug 33.

Ports 35 balance approximately the axial forces exerted on plug 33 due to the upstream pressure in chamber 16. Isolation against upstream pressure is not quite so important because upstream pressure is not subject to variation to the same extent as the downstream pressure. The area occupied by the connection of rod 34 to the closed end of plug 33 gives rise to a small unbalancing upward force in the axial direction due to the upstream pressure. This unbalancing force is cancelled by the particular way in which the seal is formed at flange 28 of cage 30. As illustrated in FIG. 2, O-ring 36 is retained by an inwardly tapered groove defined by the outside surface of the side wall of cage 30, the top of flange 28, and a retaining ring 50. Flange 28 has a groove 52 and a protrusion 53. Retaining ring 50 is maintained in groove 52 by a press fit. Annular regions 54, 55, and 56 are formed at the open end of plug 33. When the valve element is in its closed state, plug 33 is lowered suffiently for region 54 to engage over its entire surface O-ring 36, as illustrated in FIG. 2. Protrusion 53 serves as a stop for region 55 to prevent damage to O-ring 36 and the space formed by region 56 provides seal relief. Regions 55 and 56 are not sealed. Therefore, the upstream pressure in chamber 16 acts on them, but not on the surface of region 54. The fact that the upstream pressure does not act on region 54 creates an axial unbalancing force in the opposite direction from the unbalancing force due to the connection of rod 34 to the closed end of plug 33. To cancel these unbalancing forces, the area of region 54 is designed to be equal to the cross sectional area of rod 34. (This assumes regions 54, 55, and 56 and the closed end of plug 33 all lie in planes perpendicular to the axis of rod 34.) Consequently, the forces exerted on plug 33 are precisely balanced with respect to the upstream pressure when the valve element is in the closed state.

Reference is made to FIGS. 1 and 3 for a description of a two stage arrangement for individually controlling the valve elements. One stage comprises a plurality of bistable pilot valves individual to the respective control valve elements. The pilot valves are described in detail below in connection with FIGS. 4A and 4B. The other stage comprises a plurality of actuators 60 individual to the respective control valve elements. Fluid from a common manifold is supplied to each of actuators 60 under the control of the corresponding pilot valve. An annular housing 61 (FIG. 3) is mounted on the outer surface of upstream chamber 16 by fasteners such as those designated 62 and 63 and extends completely around upstream chamber 16. Inside housing 61 are formed an annular region 63, which serves as the fluid supply manifold, an annular region 65, which serves as an exhaust manifold, and a plurality of deep cylindrical entrances 66 individual to the respective actuators. The axes of entrances 66 are all parallel to axis 18 and distributed around the inside of housing 61 at intervals corresponding to the distribution of actuators 60 around upstream chamber 16. The pilot valves and their associated electrical connections (not shown in FIG. 3) are distributed around region 65 at intervals corresponding to the distribution of entrances 66. Ports 67, ports 68, and cylindrical cavities 69 are also distributed around the inside of housing 61 at intervals corresponding to the distribution of entrances 66. Port 67 couples entrance 66 to cavity 69 and port 68 couples supply manifold region 64 to cavity 69. The actuating fluid under pressure is supplied to manifold region 64 from a single fluid source (not shown) by an inlet 70. Fluid is vented from exhaust manifold region 65 by an outlet 71 to the atmosphere or to the low pressure side of the actuating fluid source for recirculation, depending upon whether an open or a closed actuating fluid system is employed. In one state of the pilot valve, fluid under pressure from supply manifold region 64 is coupled through ports 68 and 67 to entrance 66. In the other state of the pilot valve, fluid is vented from entrance 66 through port 67 and cavity 69 to exhaust manifold region 65.

Each of actuators 60 is identical. A cylinder 75 is mounted on a base 76. The lower portion of base 76 is threaded. A hole 77 in upstream chamber 16 is coaxial with the components of the corresponding valve element. Hole 77 has threads that match the threads of base 76 to form a threaded connection with a metal-to-metal seal when base 76 is screwed completely into hole 77. A cap 78 covers the end of cylinder 75 opposite base 76. Cap 78 is secured by a number of screws such as that designated 79, which pass through holes in the periphery of cap 78 and form threaded connections with holes in base 76. As a result, cylinder 75 is clamped between cap 78 and base 76, and its interior is sealed at both ends. A piston 80 moves axially within cylinder 75. A threaded connection is formed between piston 80 and the end of rod 34.

Rod 34 extends between piston 80 and plug 33 through a bore 81 in base 76. Bore 81 has counterbores 82 and 83 at its ends. O-rings 84 and 85 are retained at the bases of counterbores 82 and 83, respectively, by cylindrical inserts 86 and 87, respectively, that have sufficiently large outside diameters to form force fits in counterbores 82 and 83, respectively. The inside diameters of inserts 86 and 87 are the same as the inside diameter of bore 81, which is slightly larger than rod 34 to allow clearance for rod 34. O-rings 84 and 85 engage rod 34 and seal upstream chamber 16 from the interior of cylinder 75. Any fluid which may leak through O-rings 84 or 85 is vented to the atmosphere through a small hole 88.

A shallow cylindrical entrance 90 (FIG. 3) is formed in the wall of cylinder 75 near base 76. A longitudinal hole 91 is formed in the wall of cylinder 75 parallel to its axis to carry fluid to and from the upper side of piston 80, which is urged in an upper direction by a compression spring 92. Piston 80 has spring retainers on both sides. The spring retainer on the lower side and insert 87 control the position of spring 92. The axes of entrances 66 and 90 are aligned and their diameters are equal. A straight, rigid tube 93 has an O-ring 94 at one end that forms a seal at entrance 90 and an O-ring 95 at the other end that forms a seal at entrance 66. One end of tube 93 is bottomed against the end of entrance 90, where it is maintained by a snap ring 96. The sum of the distance between cylinder 75 and housing 61 and the depth of entrance 66 is greater than the length of tube 93. As a result, it is possible to replace actuator 60 in a simple, straightforward manner. Snap ring 96 is removed, tube 93 is slid into entrance 66 until it is free of entrance 90, and base 76 is unscrewed from upstream chamber 16. Actuator 60 is replaced by reversing these three simple steps.

It should be noted that actuator 60, which is shown as fail-open (in the absence of fluid pressure, spring 92 urges the valve elements into the open state), could be made fail-closed with a few minor modifications. Specifically, entrance 90 would be axially extended to the interior of cylinder 75 so fluid is provided below piston 80, spring 92 would be place above piston 80, rod 34 would be shortened, hole 91 would be eliminated, and the length of cylinder 75 would be changed accordingly. There is also substantial interchangeability of components for different size valve elements. Due to the described design of the valve elements, all the rod diameters can be identical and all the cylinder diameters can be identical. Therefore, the same O-rings, inserts, caps, and bases can be employed in all sizes.

Figure 4A:
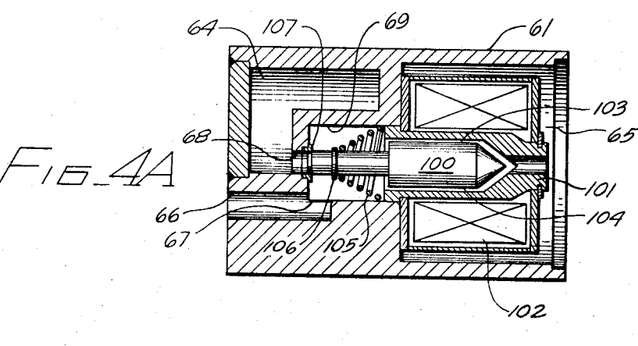
FIGS. 4A and 4B are side elevation views in section of the bistable pilot valve in each of its two states.
Figure 4B:
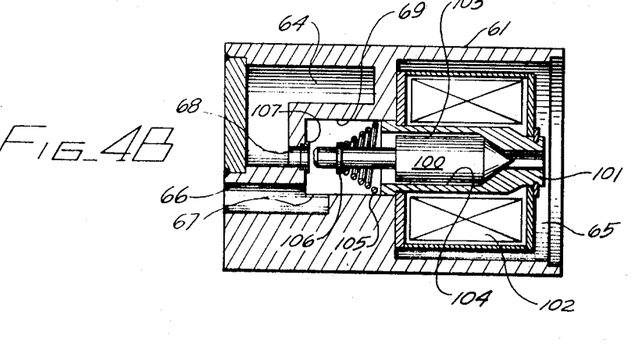

In FIGS. 4A and 4B one of the bistable pilot valves is shown in its fluid venting and fluid supplying states, respectively. One end of a plug 100 is disposed in cavity 69, and the other end is disposed inside a hollow core 101 of an electromagnet 102. Plug 100 is made of magnetic material. Plug 100 has grooves 103 and 104, which form venting channels in the interior of core 101. At one end, the interior of core 101 and plug 100 have matching conical surfaces that form a seal when they abut one another. A conical compression spring 105 is maintained between one end of core 101 and a snap ring 106.

When electromagnet 102 is not energized, spring 105 urges plug 100 to the left as viewed in FIG. 4A to form a seal with an insert 107 at the mouth of port 68. Thus, fluid from cylinder 75 is vented through tube 93, entrance 66, and port 67 and through the hollow interior of core 101 via the venting channels to exhaust manifold region 65. Spring 92 then drives piston 80 up against cap 78 and the valve element assumes its open state. Care is taken that cylinder 75 is long enough to enable piston 80 to lift plug 33 enough to uncover completely perforations 32, i.e., to remove the plug completely out of the dynamic fluid region.

When electromagnet 102 is energized, plug 100 is drawn to the right as viewed in FIG. 4B, into core 101 so the matching conical surfaces of plug 100 and core 101 seal the hollow interior of core 101. The movement of plug 100 also opens port 68. Thus, fluid under pressure from supply manifold region 64 flows from port 68 to port 67 and through tube 93 to cylinder 75. Piston 80 is then driven downward and the valve element assumes its closed state.

An electrical connector 110 (FIG. 3) is mounted on the outside of housing 61 to provide power and binary control signals for the electromagnets. In a typical application, the disclosed fluid flow control system would be part of a feedback system that controls the dynamic parameters associated with fluid flow. Specifically, the disclosed fluid flow control system could comprise block 112 in FIG. 6 or block 126 in FIG. 7 of the above Hutton application, the disclosure of which is incorporated herein by reference. In such case, the binary control signals would be applied through connector 110.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention as set forth in the following claims.

What is claimed is:

1. A fluid flow control system comprising:
an upstream chamber;
a downstream chamber;
a plurality of individually actuatable bistable digital valve elements interconnecting the upstream chamber and the downstream chamber, each valve element having a stationary valve housing disposed in the upstream chamber, one or more perforations in the side of the housing connecting the interior of the housing with the upstream chamber, an orifice in the end of the housing to connect the interior of the housing with the downstream chamber, and a movable plug capable of assuming only one of two stable positions, the plug preventing flow from the upstream chamber to the downstream chamber through the perforations and the orifice in the one stable position and enabling flow from the upstream chamber to the downstream chamber through the perforations and the orifice in the other stable position; and
the resultant areas of the perforations in at least some of the respective housings varying in accordance with a geometric progression to determine the flow rate through the respective valve elements and the areas of the orifices of such respective housings being the same.

2. The fluid flow control system of claim 1, in which the movable plug fits over the stationary valve housing in the upstream chamber, the plug covering the housing in the one stable position to prevent flow from the upstream chamber to the downstream chamber, and uncovering the housing in the other stable position to enable flow from the upstream chamber to the downstream chamber.

3. The system of claim 2, in which the plug lies slightly above the top of the perforations in the other stable position.

4. The system of claim 1, in which the plug lies slightly above the top of the perforations outside the flow stream in the other stable position.

5. The fluid flow control system of claim 1, in which the perforations formed in the sides of the respective cages are distributed in oppositely arranged pairs.

6. A fluid flow control system comprising:
a first cylinderical conduit;

a second cylindrical conduit, the first conduit being coaxially disposed around the second conduit;

a plurality of individually actuatable control valve elements interconnecting the first and second conduits, the control valve elements being distributed about the cylindrical axis between the first and second conduits;

means individual to each control valve element for actuating such control valve element responsive to fluid, the actuating means being distributed about the outside of the first conduit over the respective valve elements;

an annular housing disposed around the conduits in proximity to the actuating means individual to each control valve element;

a common fluid supply manifold formed in the housing, the manifold containing fluid under pressure;

means for coupling the supply manifold to each of the actuating means; and a plurality of bistable pilot valves individual to the respective actuating means and disposed in the housing for controlling the flow of fluid from the common supply manifold through the coupling means to such actuating means so as to control the corresponding control valve element, each pilot valve coupling fluid from the supply manifold to the corresponding actuating means through the coupling means in one state and coupling fluid from the corresponding actuating means to a fluid receiver in the other state so as to maintain the corresponding control valve element in one of two bistable states depending upon the state of the pilot valve.

7. The system of claim 6, in which the pilot valves are distributed within the housing at intervals corresponding to the distribution of the actuating means about the first conduit.

8. The system of claim 7, in which the receiver is an annular venting manifold formed within the housing.

9. The system of claim 7, in which the actuating means each comprise a cylinder, a piston inside the cylinder and movable along the axis of the cylinder, a rod coupling the piston to the control valve element, and a spring disposed inside the cylinder on one side of the piston to urge the piston to one end of the cylinder, and the coupling means leads between the pilot valve and the inside of the cylinder on the other side of the piston.

10. The system of claim 9, in which the compling means for each actuating means comprises a first entrance into the cylinder, a second entrance into the housing having a diameter equal to that of the first entrance and being axially aligned with the first entrance, one of the entrances being shallow and the other entrance being deep, a straight rigid tube connected between the first and second entrances, the length of the tube being less than the sum of the length of the deep entrance and the distance between the housing and the cylinder, and a retaining ring disposed around the tube at the deep entrance to secure the tube.

11. The system of claim 9, in which the piston has spring retainers on both sides.

12. The system of claim 9, in which one end of the cylinder is formed by a base plug fitted in the wall of the first conduit; a pair of seals are formed at the point where each rod extends through the base plug to the valve element, the seals each comprising a bore through the base plate slightly larger than the rod, a counterbore formed at one end of the bore, an O-ring disposed at the base of the counterbore, and a cylindrical insert forming a press fit with the counterbore to establish a retaining groove for the O-ring, the rod extending through the bore and the insert and engaging the O-ring to seal the first conduit from the cylinder; and a vent from the bore between the O-rings.

13. A fluid flow control system comprising:

a first cylindrical chamber disposed about a flow axis;

a second cylindrical chamber disposed about the flow axis;

a plurality of cylindrical cages with their respective cylindrical axes disposed radially about the flow axis between the chambers, each cage being open at one end to form a port communicating with the second chamber and closed at the other end;

one or more perforations formed in the sides of the respective cages to communicate with the first chamber, the total area of the perforations in at least some of the respective cages varying in accordance with a geometric progression;

a plurality of cylindrical plugs corresponding to the respective cages, the plugs lying outside their corresponding cages, the plugs being disposed radially about the flow axis in axial alignment with their corresponding cages, the plugs being adapted to fit over their corresponding cages, and the plugs being radially movable toward and away from the flow axis; and means for individually positioning the plugs into one of two stable positions, the plugs covering their corresponding cages in one stable position to prevent fluid flow therethrough from one chamber to the other and uncovering their corresponding cages in the other stable position to enable fluid flow therethrough from one chamber to the other.

14. The system of claim 13, in which the plugs each have one closed end and one open end, the system additionally comprising an annular base seal disposed around the outside of each cage near its open end to engage the open end of the corresponding plug; and means for retaining the base seal relative to each cage to seal the interior of such cage from the first chamber when the plug engages the base seal in the one stable position.

15. The system of claim 14, in which the closed end of each plug has at least one opening to balance approximately the forces exerted by the fluid pressure in the first chamber on such plug by permitting fluid flow between the first chamber and the space between such plug and the cage.

16. The system of claim 15, in which the positioning means each comprise an actuator and a rod coupling the actuator to the closed end of the corresponding plug to move the corresonding plug as the rod moves axially, the axes of the corresponding cage, the corresponding plug, and the rod being aligned.

17. The system of claim 13, additionally comprising an annular side seal disposed around the outside of each cage between the perforations and the closed end of such cage to engage the side of the corresponding plug and means for retaining the side seal relative to each cage to seal the opening in the closed end of the corresponding plug from the perforations in such cage.

18. The system of claim 13, in which the ports of all the cages have the same diameter.

19. The system of claim 13, in which the means for individually positioning the plugs comprise a fluid driven piston individual to each plug, a common supply manifold for fluid to drive the pistons, and means individual to each plug for controlling the flow of fluid from the manifold to the piston of such plug to move the plug between the two stable positions.

20. The fluid flow control system of claim 13, in which the positioning means raises the plugs above all the perforations in the corresponding cages in the other stable position.

21. The fluid flow control system of claim 13, in which the first chamber is larger in cross section and surrounds the second chamber.

22. The fluid flow control system of claim 13, in which the perforations formed in the sides of the respective cages are distributed in oppositely arranged pairs.

23. A fluid flow control system comprising:
a first conduit;
a second conduit;
a plurality of individually actuatable control valve elements interconnecting the first and second conduits;
means individual to each control valve element for actuating such control valve element responsive to fluid, each actuating means being disposed in an enclosure;
a housing supported in proximity to one of the conduits;
a common fluid supply manifold formed in the housing; and
means for coupling the supply manifold to each of the actuating means, each coupling means comprising a first entrance into the enclosure, a second entrance into the housing having a diameter equal to that of the first entrance and being axially aligned with the first entrance, one of the entrances being shallow and the other entrance being deep, a straight rigid tube connected between the first and second entrances, the length of the tube being less than the sum of the length of the depth of the entrances and the distance between the housing and the cylinder, and means for retaining the tube against axial movement.

24. A fluid flow control system comprising:
a first cylindrical chamber disposed about a flow axis;
a second cylindrical chamber disposed about the flow axis;
a plurality of cylindrical cages with their respective cylindrical axes disposed radially about the flow axis between the chambers, each cage being open at one end to form a port communicating with the second chamber and closed at the other end, the ports of all the cages having the same diameter;
one or more perforations formed in the side of each cage to communicate with the first chamber;
a plurality of cylindrical plugs corresponding to the respective cages, the plugs lying outside their corresponding cages, the plugs being disposed radially about the flow axis in axial alignment with their corresponding cages, the plugs being adapted to fit over their corresponding cages, and the plugs being radially movable toward and away from the flow axis; and
means for individually positioning the plugs into one of two stable positions, the plugs covering their corresponding cages in the one stable position to prevent fluid flow therethrough from one chamber to the other and uncovering their corresponding cages in the other stable position to enable fluid flow therethrough from one chamber to the other.

25. The fluid flow control system of claim 24, in which the perforations formed in the sides of the respective cages are distributed in oppositely arranged pairs.

26. A fluid flow control system comprising:
a first cylindrical chamber disposed about a flow axis;
a second cylindrical chamber disposed about the flow axis;
a plurality of cylindrical cages with their respective cylindrical axes disposed radially about the flow axis between the chambers, each cage being open at one end to form a port communicating with the second chamber and closed at the other end;
one or more perforations formed in the side of each cage to communicate with the first chamber;
a plurality of cylindrical plugs corresponding to the respective cages, the plugs lying outside their corresponding cages, the plugs being disposed radially about the flow axis in axial alignment with their corresponding cages, the plugs being adapted to fit over their corresponding cages, and the plugs being radially movable toward and away from the flow axis;
fluid driven pistons for individually positioning the respective plugs into one of two stable positions, the plugs covering their corresponding cages in the one stable position to prevent fluid flow therethrough from one chamber to the other and uncovering their corresponding cages in the other stable position to enable fluid flow therethrough from one chamber to the other;
a common supply manifold for fluid to drive the pistons; and
means individual to each plug for controlling the flow of fluid from the manifold to the respective pistons to move such plug between the two stable positions.

* * * * *

PO-1050
(5/69)

UNITED STATES PATENT OFFICE
CERTIFICATE OF CORRECTION

Patent No. 3,746,041     Dated July 17, 1973

Inventor(s) Harry Friedland

It is certified that error appears in the above-identified patent and that said Letters Patent are hereby corrected as shown below:

Patent column 3, delete lines 9 through 18 and substitute therefor the following --According to another aspect of the invention, the resultant areas of the perforations, which comprise the flow determining orifice, in at least some of the valve elements vary in accordance with a geometric progression. Preferably, the ports at the end of the cages opening into the downstream conduit all have the same diameter.--

Patent column 4, line 41, change "O-ring 36" to --O-ring 37--.

Patent column 5, line 4, change "th" to --the--;
              line 45, change "suffiently" to --sufficiently--.

Patent column 6, line 10, change "annular region 63" to --annular region 64--.

Patent column 9, line 48, change "compling" to --coupling--.

Signed and sealed this 9th day of April 1974.

(SEAL)
Attest:

EDWARD M. FLETCHER, JR.
Attesting Officer

C. MARSHALL DANN
Commissioner of Patents